US010688898B2

(12) United States Patent
Son

(10) Patent No.: US 10,688,898 B2
(45) Date of Patent: Jun. 23, 2020

(54) POSITION-ADJUSTABLE CERVICAL VERTEBRAE SUPPORT APPARATUS CAPABLE OF BEING INSTALLED IN BACK OF VEHICLE SEAT

(71) Applicant: Iksoo Son, Daegu (KR)

(72) Inventor: Iksoo Son, Daegu (KR)

(*) Notice: Subject to any disclaimer, the term of this patent is extended or adjusted under 35 U.S.C. 154(b) by 0 days.

(21) Appl. No.: 16/417,753

(22) Filed: May 21, 2019

(65) Prior Publication Data

US 2020/0001757 A1    Jan. 2, 2020

(30) Foreign Application Priority Data

Jun. 29, 2018 (KR) .................. 10-2018-0075482

(51) Int. Cl.
*B60N 2/22* (2006.01)
*B60N 2/64* (2006.01)
*A47C 7/42* (2006.01)

(52) U.S. Cl.
CPC .............. *B60N 2/643* (2013.01); *A47C 7/425* (2013.01); *B60N 2/22* (2013.01)

(58) Field of Classification Search
CPC ...... B60N 2/0224; B60N 2/0232; B60N 2/22; B60N 2/66; B60N 2/643; B60N 2/666; A47C 7/462; A47C 7/425
USPC .......................................................... 297/61
See application file for complete search history.

(56) References Cited

U.S. PATENT DOCUMENTS

| 5,567,011 A * | 10/1996 | Sessini | B60N 2/0232 297/284.4 |
| 6,530,622 B1 * | 3/2003 | Ekern | B60N 2/2222 297/284.1 |
| 2008/0246323 A1 * | 10/2008 | Kuno | B60N 2/0232 297/396 |
| 2009/0218853 A1 * | 9/2009 | Harth | B60N 2/68 297/16.1 |
| 2012/0068508 A1 * | 3/2012 | LaPointe | A47C 7/462 297/284.8 |
| 2015/0115679 A1 * | 4/2015 | Muck | A47C 7/462 297/284.7 |

(Continued)

FOREIGN PATENT DOCUMENTS

| KR | 10-0162170 B1 | 12/1998 |
| KR | 20-1999-0018485 U | 6/1999 |
| KR | 10-2010-0033584 A | 3/2010 |

*Primary Examiner* — Mark R Wendell
(74) *Attorney, Agent, or Firm* — KORUS Patent, LLC; Seong Il Jeong

(57) ABSTRACT

Disclosed herein is a position-adjustable cervical vertebrae support apparatus. The cervical vertebrae support apparatus includes: a cervical vertebrae supporting member (50) which supports the cervical vertebrae of a driver; a front-back distance adjusting unit (60) in which a mounting plate (68) is brought into close contact with and fastened to the back of the cervical vertebrae supporting member (50), a left-handed screw rod (61) and a right-handed screw rod (62) are located at a distance from the back of the mounting plate (68), movable nuts (63 and 64) are disposed around the left-handed screw rod (61) and the right-handed screw rod (62), respectively, distance adjustment rods (74) are coupled to the movable nuts (63 and 64), is also coupled to both sides hinges (76) in a crossed manner and is rotatable around a central pin (72); and an up-down distance adjusting unit (80).

4 Claims, 5 Drawing Sheets

(56) References Cited

U.S. PATENT DOCUMENTS

2015/0165949 A1\* 6/2015 Tobata ..................... B60N 2/16
 297/338
2017/0210256 A1\* 7/2017 Kondrad ................ B60N 2/165

\* cited by examiner

POSITION-ADJUSTABLE CERVICAL VERTEBRAE SUPPORT APPARATUS CAPABLE OF BEING INSTALLED IN BACK OF VEHICLE SEAT

CROSS-REFERENCE TO RELATED APPLICATION

This application claims the benefit of Korean Patent Application No. 10-2018-0075482 filed on Jun. 29, 2018, which is hereby incorporated by reference herein in its entirety.

BACKGROUND

1. Technical Field

The present invention relates generally to a position-adjustable cervical vertebrae support apparatus capable of being installed in the back of a vehicle seat, and more specifically to a position-adjustable cervical vertebrae support apparatus capable of being installed on the back of a vehicle seat, which adjusts the position of the posterior cervical vertebra (the neck bone) of a driver and then supports the posterior cervical vertebra on the back of a vehicle seat in accordance with the body characteristics of the driver, so that the driving posture of the driver may be corrected in accordance with the body characteristics of the driver and a stable driving posture may be continuously maintained, thereby relieving driving fatigue.

2. Description of the Related Art

In general, the seats of a vehicle can support a driver or passengers safely and comfortably within limited space and weight ranges. These seats include a driver's seat, a front passenger seat, and back seats. Furthermore, the seats are classified into bench seats formed in long chair shapes and separate seats configured to be separate from each other according to their shape.

Such a seat of a vehicle includes a seat base configured to support the buttocks of a sitting person and a back configured to support the back of the sitting person.

When a driver drives a vehicle while holding his or her body on a seat of the vehicle, the driver usually drives the vehicle in a state in which his or her lumbar vertebrae, i.e., the lower part of his or her spine, have been brought into close contact with the back of the seat and his or her thoracic vertebrae or cervical vertebrae present above the lumbar vertebrae have been separated from the back of the seat. In particular, in the case of a beginning driver, the case is more severe.

Such an incorrect driving posture easily causes a driver's fatigue, and thus a problem arises in that the driver who is suffering from fatigue is more likely to cause a major accident because instantaneous judgment is slowed down or becomes inaccurate.

PRIOR ART DOCUMENT

Patent Document (Patent Document 1) Korean Patent No. 10-0162170

SUMMARY

The present invention has been conceived to overcome the above-described problems, and an object of the present invention is to provide a position-adjustable cervical vertebrae support apparatus capable of being installed on the back of a vehicle seat, which adjusts the position of the posterior cervical vertebra (the neck bone) of a driver and then supports the posterior cervical vertebra on the back of a vehicle seat in accordance with the body characteristics of the driver, so that the driving posture of the driver may be corrected in accordance with the body characteristics of the driver and a stable driving posture may be continuously maintained, thereby relieving driving fatigue.

In order to accomplish the above object, the present invention provides a position-adjustable cervical vertebrae support apparatus capable of being installed in a back of a vehicle seat, the cervical vertebrae support apparatus being constructed in the back of the vehicle seat including a seat base (10), a back (20), and a headrest (30), the cervical vertebrae support apparatus including: a cervical vertebrae supporting member (50) which is located in an installation space part (92) open in the upper and front end portions of the back (20) and which supports the cervical vertebrae of a driver; a front-back distance adjusting unit (60) in which a mounting plate (68) is brought into close contact with and fastened to the back of the cervical vertebrae supporting member (50), a left-handed screw rod (61) and a right-handed screw rod (62) are located at a distance from the back of the mounting plate (68), movable nuts (63 and 64) are disposed around the left-handed screw rod (61) and the right-handed screw rod (62), respectively, distance adjustment rods (74) are coupled to the movable nuts (63 and 64), is also coupled to both sides hinges (76) provided on the back of the mounting plate (68) in a crossed manner and is rotatable around a central pin (72), and the left-handed screw rod (61) and the right-handed screw rod (62) are rotated by a motor (67), so that, as the distance adjustment rods (74) are rotated in a crossed state by the rotation of the left-handed screw rod (61) and the right-handed screw rod (62) by the motor (67), the cervical vertebrae supporting member (50) is moved forward or backward; and an up-down distance adjusting unit (80) in which a vertical mounting plate (81) is provided to support a side of the motor (67), a bottom mounting base (83) is provided to support the bottom side of the vertical mounting plate (81), and a rod (85) coupled to a cylinder (87) is connected to the bottom of the bottom mounting base (83) in order to lift or lower the bottom mounting base (83), so that the cervical vertebrae supporting member (50) is vertically moved by the operation of the cylinder (87).

A plate-shaped front vertical cover portion (52) may be formed on the front of the lower end of the cervical vertebrae supporting member (50) the distance of which is adjusted on the back (20) by the front-back distance adjusting unit (60), a plate-shaped back vertical cover portion (54) may be formed at a distance from the back of the front vertical cover portion (52), and a front support plate portion (21) extending vertically from the top of the front of the back (20) may be inserted between the front vertical cover portion (52) and the back vertical cover portion (54), so that the front support plate portion (21) may be brought into close contact with inner surfaces of the front vertical cover portion (52) and the back vertical cover portion (54) by the forward and backward movement of the front vertical cover portion (52) and the back vertical cover portion (54), and thus the forward and backward movement of the cervical vertebrae supporting member (50) may be limited.

The back of the upper end of the cervical vertebrae supporting member (50) the distance of which is vertically adjusted on the back (20) by the up-down distance adjusting unit (80) may be seated on a downward movement limiting plate (25) horizontally formed on the inside of a back support plate portion (23) extending vertically from the upper end of the back side of the back (20), so that the downward movement of the cervical vertebrae supporting member (50) may be limited.

The back of the upper end of the cervical vertebrae supporting member (50) may be configured to be seated in a seat groove portion (24) depressed into the upper end of the back support plate portion (23) extending vertically from the upper end of the back side of the back (20).

Any one of heating and vibration means may be provided inside the cervical vertebrae supporting member (50).

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Details for the practice of the present invention will be described in detail below with reference to the accompanying drawings.

Figure 1:
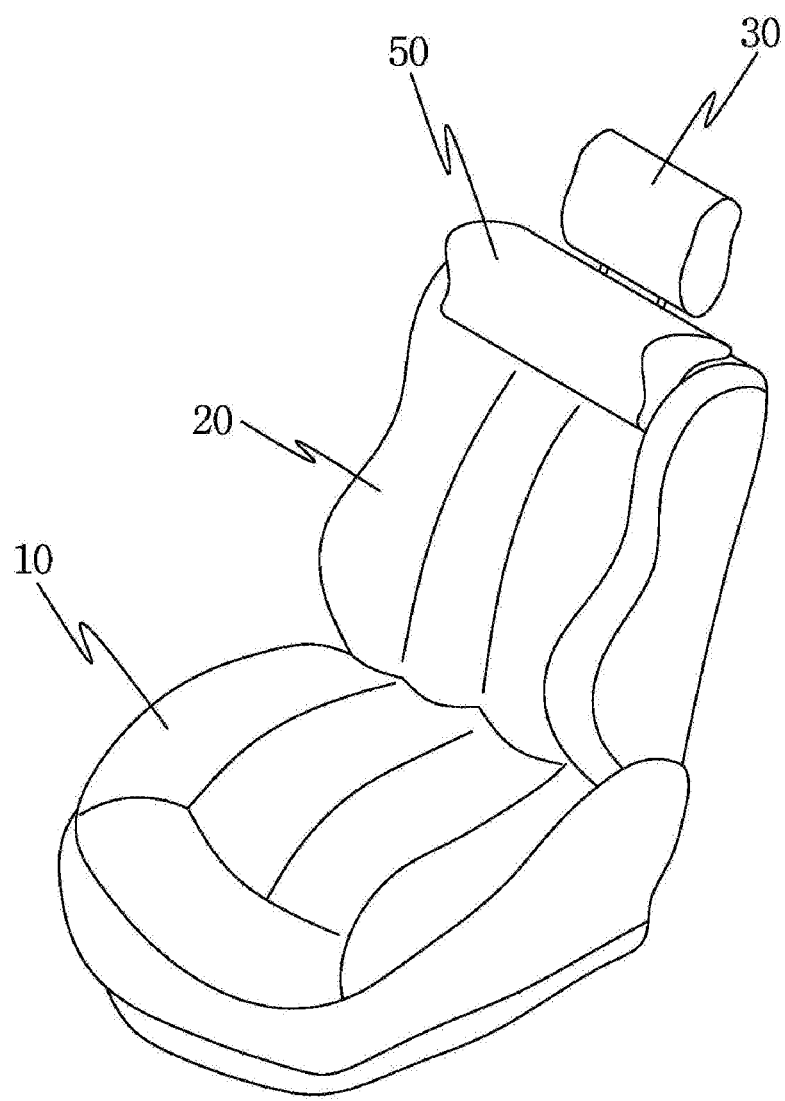
FIG. 1 is an exemplary perspective view showing the back of a vehicle seat on which a position-adjustable cervical vertebrae support apparatus according to the present invention has been installed.
Figure 2:
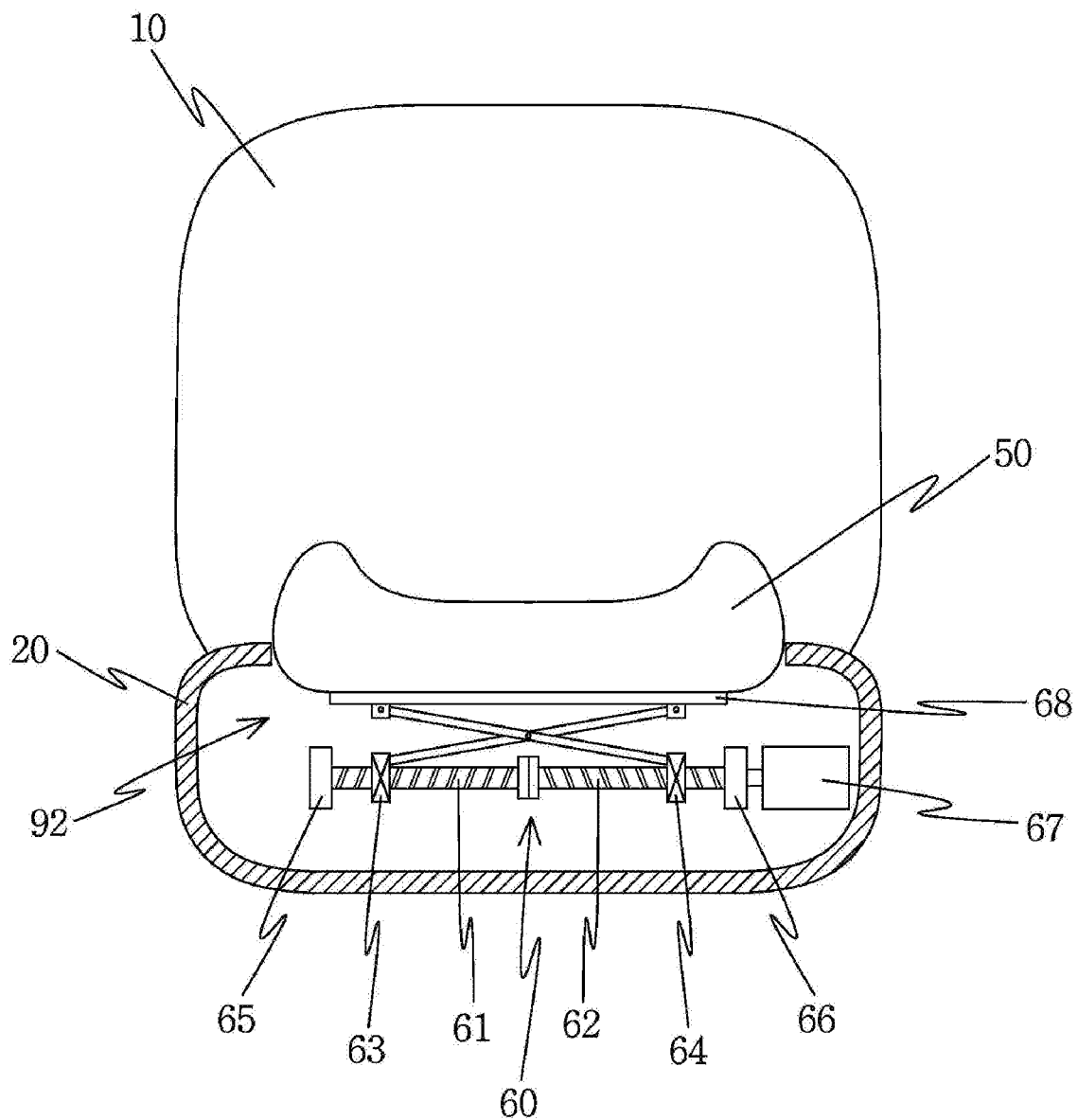
FIG. 2 is an exemplary sectional view showing FIG. 1 when viewed from above.
Figure 3:
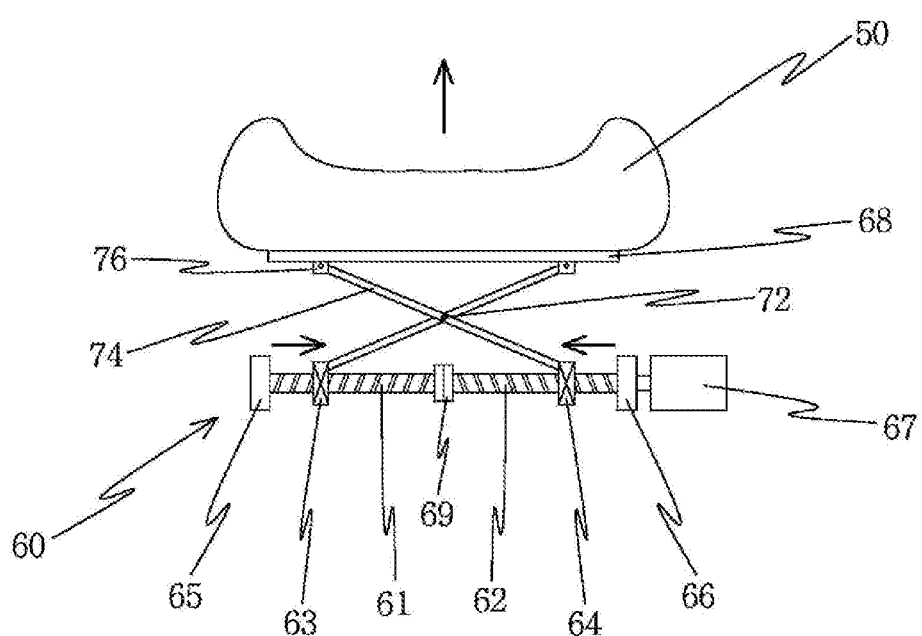
FIG. 3 is an exemplary sectional view showing the configuration of the important portion of the present invention when viewed from above.
Figure 4:
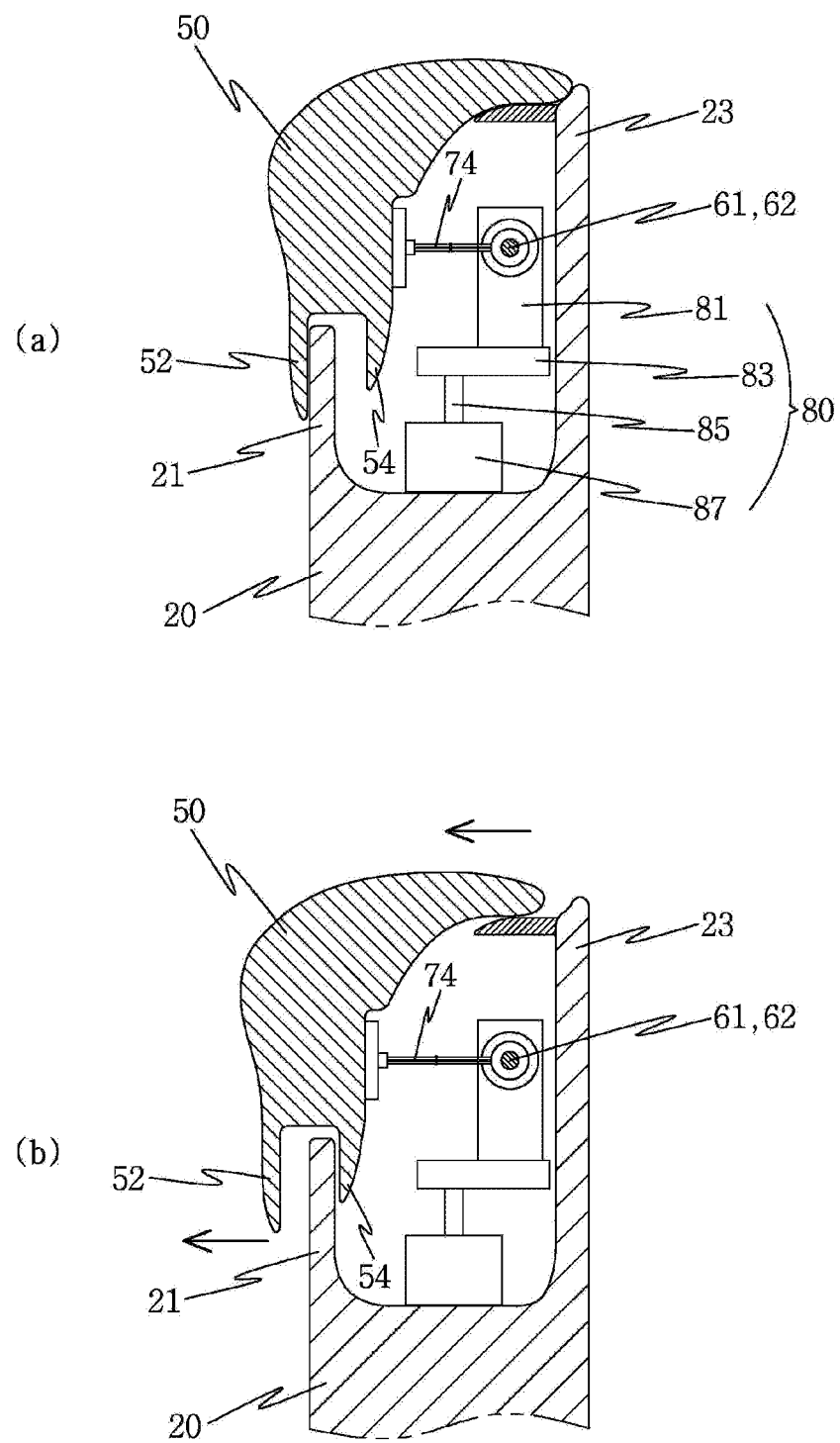
FIG. 4 shows exemplary views showing states in which the cervical vertebrae supporting member of the present invention has been moved forward and backward.
Figure 5:
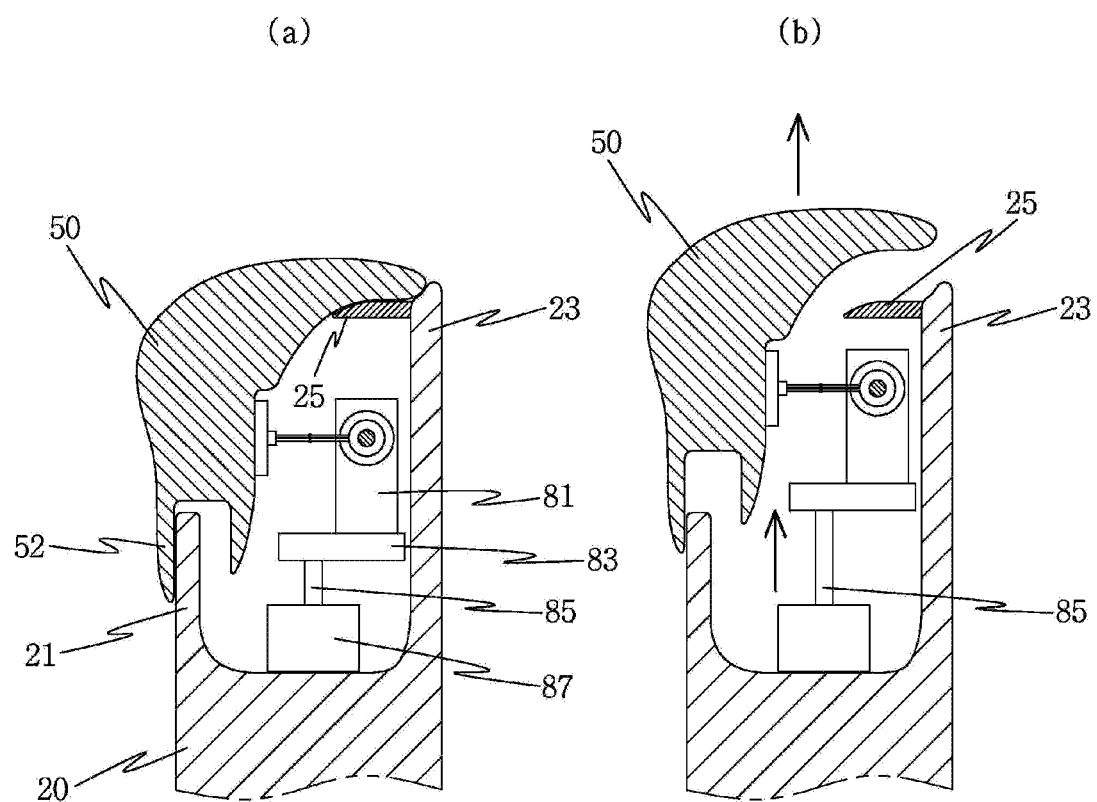
FIG. 5 shows exemplary views showing states in which the cervical vertebrae supporting member of the present invention has been moved upward and downward.

FIG. 1 is an exemplary perspective view showing the back of a vehicle seat on which a position-adjustable cervical vertebrae support apparatus according to the present invention has been installed, FIG. 2 is an exemplary sectional view showing FIG. 1 when viewed from above, FIG. 3 is an exemplary sectional view showing the configuration of the important portion of the present invention when viewed from above, FIG. 4 shows exemplary views showing states in which the cervical vertebrae supporting member of the present invention has been moved forward and backward, and FIG. 5 shows exemplary views showing states in which the cervical vertebrae supporting member of the present invention has been moved upward and downward. Referring to FIGS. 1 to 5, a position-adjustable cervical vertebrae support apparatus capable of being installed in the back of a vehicle seat, which adjusts the position of the posterior cervical vertebra (the neck bone) of a driver and supports the posterior cervical vertebra on the back of a vehicle seat in accordance with the body characteristics of the driver, so that the driving posture of the driver may be corrected in accordance with the body characteristics of the driver and a stable driving posture may be continuously maintained, thereby relieving driving fatigue, is configured to include a cervical vertebrae supporting member 50, an front-back distance adjusting unit 60, and an up-down distance adjusting unit 80.

First, the cervical vertebrae support apparatus according to the present invention is constructed in the back of a vehicle seat including a seat base 10, a back 20, and a headrest 30, as shown in FIG. 1. To implement the apparatus, the cervical vertebrae supporting member 50 is configured to be located in an installation space part 92 open in the upper and front end portions of the back 20 and to support the cervical vertebrae of a driver, as shown in FIG. 2.

The cervical vertebrae supporting member 50 is a means for correcting a driving posture and continuously maintaining a stable driving posture by supporting the back of the cervical vertebrae (a neck bone) of a driver on the back 20. In addition, at least one of a heating means (not shown) and a vibration means (not shown) may be provided inside the cervical vertebrae supporting member 50, and may allow a driver to perform a fomentation or massage function while resting in a vehicle.

The front-back distance adjusting unit 60 and the up-down distance adjusting unit 80 are included in the cervical vertebrae supporting member 50. First, to construct the front-back distance adjusting unit 60, a mounting plate 68 is brought into close contact with and fastened to the back of the cervical vertebrae supporting member 50, a left-handed screw rod 61 and a right-handed screw rod 62 are located at a distance from the back of the mounting plate 68, and movable nuts 63 and 64 are disposed around the left-handed screw rod 61 and the right-handed screw rod 62, respectively, as shown in FIGS. 3 and 4.

Furthermore, distance adjustment rods 74 are coupled to the movable nuts 63 and 64, also coupled to both sides hinges 76 provided on the back of the mounting plate 68 in a crossed manner and rotatable around a central pin 72, and the left-handed screw rod 61 and the right-handed screw rod 62 are rotated by a motor 67.

According to the above configuration, as the distance adjustment rods 74 are rotated in a crossed state by the rotation of the left-handed screw rod 61 and the right-handed screw rod 62 by the motor 67, the cervical vertebrae supporting member 50 is moved forward or backward, as shown in FIGS. 3 and 4(b).

In this case, as shown in FIG. 4, in an embodiment, a plate-shaped front vertical cover portion 52 is formed on the front of the lower end of the cervical vertebrae supporting member 50 the distance of which is adjusted on the back 20 by the front-back distance adjusting unit 60, a plate-shaped back vertical cover portion 54 is formed at a distance from the back of the front vertical cover portion 52, and a front support plate portion 21 extending vertically from the top of the front of the back 20 is inserted between the front vertical cover portion 52 and the back vertical cover portion 54. Accordingly, the front support plate portion 21 is brought into close contact with the inner surfaces of the front vertical cover portion 52 and the back vertical cover portion 54 by the forward and backward movement of the front vertical cover portion 52 and the back vertical cover portion 54, and thus the forward and backward movement of the cervical vertebrae supporting member 50 is limited.

Furthermore, to construct the up-down distance adjusting unit 80, a vertical mounting plate 81 is provided to support a side of the motor 67, a bottom mounting base 83 is provided to support the bottom side of the vertical mounting plate 81, and a rod 85 coupled to a cylinder 87 is connected to the bottom of the bottom mounting base 83 in order to lift or lower the bottom mounting base 83, as shown in FIG. 5. Accordingly, the cervical vertebrae supporting member 50 is vertically moved by the operation of the cylinder 87.

According to this configuration, as the bottom mounting base 83 and the vertical mounting plate 81 coupled to the rod 85 are selectively lifted and lowered by the operation of the cylinder 87, the cervical vertebrae supporting member 50 is vertically moved, as shown in FIG. 5(b).

In this case, as shown in FIG. 5, in an embodiment, the back of the upper end of the cervical vertebrae supporting member 50 the distance of which is vertically adjusted on the back 20 by the up-down distance adjusting unit 80 is seated on a downward movement limiting plate 25 horizontally formed on the inside of a back support plate portion 23 extending vertically from the upper end of the back side of the back 20, and thus the downward movement of the cervical vertebrae supporting member 50 is limited.

The downward movement limiting plate 25 performs the function of limiting the downward movement of the cervical vertebrae supporting member 50, and also performs the function of allowing the cervical vertebrae supporting member 50 to slide while supporting the back of the cervical vertebrae supporting member 50 during the forward and backward movement of the cervical vertebrae supporting member 50 by the front-back distance adjusting unit 60, as shown in FIG. 4(b).

Meanwhile, as shown in FIGS. 4 and 5, when the back of the upper end of the cervical vertebrae supporting member 50 is configured to be seated in a seat groove portion 24 depressed into the upper end of the back support plate portion 23 extending vertically from the upper end of the back side of the back 20, the force used to stably support the cervical vertebrae supporting member 50 is obtained.

According to the present invention described above, the posterior cervical vertebra (the neck bone) of a driver is adjusted in position and supported on the back of a vehicle seat in accordance with the body characteristics of the driver, so that the driving posture of the driver may be corrected in accordance with the body characteristics of the driver and a stable driving posture may be continuously maintained, thereby relieving driving fatigue.

The above-described present invention is not limited to the above-described embodiments and the accompanying drawings. It will be apparent to those having ordinary knowledge in the art to which the present invention pertains that various substitutions, alterations, and modifications may be made without departing from the technical spirit of the present invention.

What is claimed is:

1. A position-adjustable cervical vertebrae support apparatus capable of being installed in a back of a vehicle seat, the cervical vertebrae support apparatus being constructed in the back of the vehicle seat including a seat base (10), a back (20), and a headrest (30), the cervical vertebrae support apparatus comprising:
   a cervical vertebrae supporting member (50) which is located in an installation space part (92) open in upper and front end portions of the back (20) and which supports cervical vertebrae of a driver;
   a front-back distance adjusting unit (60) in which a mounting plate (68) is brought into close contact with and fastened to a back of the cervical vertebrae supporting member (50), a left-handed screw rod (61) and a right-handed screw rod (62) are located at a distance from a back of the mounting plate (68), movable nuts (63 and 64) are disposed around the left-handed screw rod (61) and the right-handed screw rod (62), respectively, distance adjustment rods (74) are coupled to the movable nuts (63 and 64), also coupled to both sides hinges (76) provided on the back of the mounting plate (68) in a crossed manner and rotatable around a central pin (72), and the left-handed screw rod (61) and the right-handed screw rod (62) are rotated by a motor (67), so that, as the distance adjustment rods (74) are rotated in a crossed state by rotation of the left-handed screw rod (61) and the right-handed screw rod (62) by the motor (67), the cervical vertebrae supporting member (50) is moved forward or backward; and
   an up-down distance adjusting unit (80) in which a vertical mounting plate (81) is provided to support a side of the motor (67), a bottom mounting base (83) is provided to support a bottom side of the vertical mounting plate (81), and a rod (85) coupled to a cylinder (87) is connected to a bottom of the bottom mounting base (83) in order to lift or lower the bottom mounting base (83), so that the cervical vertebrae supporting member (50) is vertically moved by operation of the cylinder (87);
   wherein a plate-shaped front vertical cover portion (52) is formed on a front of a lower end of the cervical vertebrae supporting member (50) a distance of which is adjusted on the back (20) by the front-back distance adjusting unit (60), a plate-shaped back vertical cover portion (54) is formed at a distance from a back of the front vertical cover portion (52), and a front support plate portion (21) extending vertically from a top of a front of the back (20) is inserted between the front vertical cover portion (52) and the back vertical cover portion (54), so that the front support plate portion (21) is brought into close contact with inner surfaces of the front vertical cover portion (52) and the back vertical cover portion (54) by forward and backward movement of the front vertical cover portion (52) and the back vertical cover portion (54), and thus forward and backward movement of the cervical vertebrae supporting member (50) is limited.

2. The position-adjustable cervical vertebrae support apparatus of claim 1, wherein a back of an upper end of the cervical vertebrae supporting member (50) a distance of which is vertically adjusted on the back (20) by the up-down distance adjusting unit (80) is seated on a downward movement limiting plate (25) horizontally formed on an inside of a back support plate portion (23) extending vertically from an upper end of a back side of the back (20), so that downward movement of the cervical vertebrae supporting member (50) is limited.

3. The position-adjustable cervical vertebrae support apparatus of claim 2, wherein a back of an upper end of the cervical vertebrae supporting member (50) is configured to be seated in a seat groove portion (24) depressed into an upper end of the back support plate portion (23) extending vertically from the upper end of the back side of the back (20).

4. The position-adjustable cervical vertebrae support apparatus of claim 3, wherein any one of heating and vibration means is provided inside the cervical vertebrae supporting member (50).

\* \* \* \* \*